United States Patent
Yang

(10) Patent No.: US 8,517,002 B2
(45) Date of Patent: Aug. 27, 2013

(54) APPARATUS FOR ANTI-FREEZING PCV

(75) Inventor: Il Suk Yang, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 112 days.

(21) Appl. No.: 13/173,922

(22) Filed: Jun. 30, 2011

(65) Prior Publication Data

US 2012/0138030 A1 Jun. 7, 2012

(30) Foreign Application Priority Data

Dec. 3, 2010 (KR) .................. 10-2010-0123013

(51) Int. Cl.
*F01M 13/00* (2006.01)
*F02M 25/00* (2006.01)

(52) U.S. Cl.
USPC ......... 123/574; 123/572; 123/573; 123/41.86

(58) Field of Classification Search
USPC .......... 123/51.86, 572–574; 92/261; 60/283, 60/708
See application file for complete search history.

(56) References Cited

U.S. PATENT DOCUMENTS

| 7,017,562 B2 * | 3/2006 | Jeon ............................. 123/572 |
| 2009/0223497 A1 * | 9/2009 | Tanaka et al. ................. 123/573 |

FOREIGN PATENT DOCUMENTS

| JP | 4536105 B2 | 6/2010 |
| KR | 10-2008-0019437 A | 3/2008 |

* cited by examiner

*Primary Examiner* — Thanh K Truong
*Assistant Examiner* — Kevin Lathers
(74) *Attorney, Agent, or Firm* — Morgan, Lewis & Bockius LLP

(57) ABSTRACT

An apparatus for anti-freezing a PCV may include a PCV chamber forming a space therein, a blow-by gas expanding in the space, an inlet connected to the PCV chamber and adapted to supply the blow-by gas to the PCV chamber, an outlet formed lower than the inlet with respect to a horizontal axis, slanted to the horizontal axis by a predetermined angle, and connected to the PCV chamber so as to exhaust the blow-by gas to a rear end of a throttle body, protruding portions formed at a front surface and a rear surface of an inner wall of the PCV chamber along an extending direction of the outlet, and guiding a condensed water at the inner wall of the PCV chamber, and a partition having plate shape and mounted along a length direction of the protruding portions at a part of the protruding portions.

7 Claims, 7 Drawing Sheets

APPARATUS FOR ANTI-FREEZING PCV

CROSS-REFERENCE TO RELATED APPLICATION

The present application claims priority of Korean Patent Application Number 10-2010-0123013 filed Dec. 3, 2010, the entire contents of which application is incorporated herein for all purposes by this reference.

BACKGROUND OF INVENTION

1. Field of Invention

The present invention relates to an apparatus for anti-freezing a positive crankcase vent (PCV). More particularly, the present invention relates to an apparatus for anti-freezing a PCV that prevents a condensed water from blocking an outlet of a PCV chamber by leading the condensed water condensed at an inner wall of the PCV chamber to a condensed water storing portion.

2. Description of Related Art

Generally, a blow-by system recirculates an exhaust gas unburned in a combustion chamber to an intake manifold through a head cover. If the intake manifold of the blow-by system is exposed to a bitter cold region (e.g., about −35° C.), moisture in a blow-by gas is condensed and frozen at inner/outer portions of a PCV nipple by a cold air and a PCV nipple passage is completely blocked.

Recently, in order to prevent the PCV nipple passage from being blocked, a PCV chamber for expanding the blow-by gas passing through the PCV nipple is formed in the intake manifold. In this case, when the blow-by gas of room temperature flowing into the PCV chamber passes through the PCV chamber or stays in the PCV chamber, the condensed water is generated at an inner wall of the PCV chamber. In addition, the blow-by gas from which the moisture is removed is supplied to a rear end of a throttle body through an outlet formed at a lower end of the PCV chamber and is mixed with an intake.

However, the condensed water in the PCV chamber moves to a lower end of the PCV chamber by gravity and meets a fresh air flowing into through the throttle body at the outlet. Therefore, the condensed water may be frozen at the outlet. As described above, the frozen condensed water may block the outlet completely and an engine may not be operated normally.

The above information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an apparatus for anti-freezing a PCV having advantages of preventing a condensed water in a PCV chamber from being frozen at an outlet and blocking the outlet completely.

One aspect of the present invention is directed to an apparatus for anti-freezing a PCV that may include a PCV chamber forming a space therein, a blow-by gas expanding in the space, an inlet connected to the PCV chamber and adapted to supply the blow-by gas to the PCV chamber, an outlet formed lower than the inlet with respect to a horizontal axis, slanted to the horizontal axis by a predetermined angle, and connected to the PCV chamber so as to exhaust the blow-by gas to a rear end of a throttle body, protruding portions formed at a front surface and a rear surface of an inner wall of the PCV chamber along an extending direction of the outlet, and guiding a condensed water at the inner wall of the PCV chamber, and a partition having plate shape and mounted along a length direction of the protruding portions at a part of the protruding portions.

The inlet may be formed at one end portion and the outlet may be formed at the other end portion with respect to the horizontal axis. The inlet may be formed at an upper portion and the outlet may be formed at a lower portion with respect to a vertical axis.

The protruding portion may be extended from the one end portion to the other end with respect to the horizontal axis.

The partition may be extended from a middle portion to the other end with respect to the horizontal axis.

A drain hole may be formed between the other end of the partition and the other end of the outlet.

The partition may be formed along the outlet at a predetermined height from a lower end of the outlet.

The predetermined height may be ⅔ of a diameter of the outlet. The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
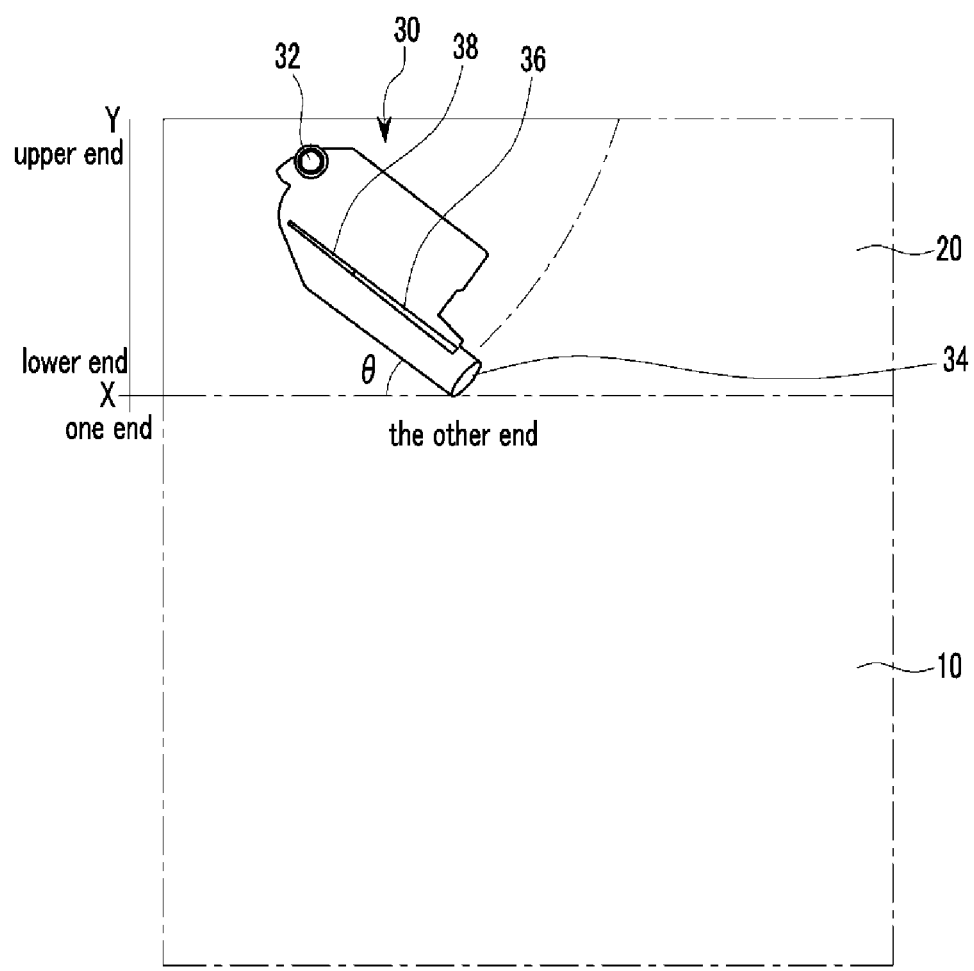
FIG. 1 illustrates an exemplary apparatus for anti-freezing a PCV according to the present invention mounted at an intake manifold portion.
Figure 2:
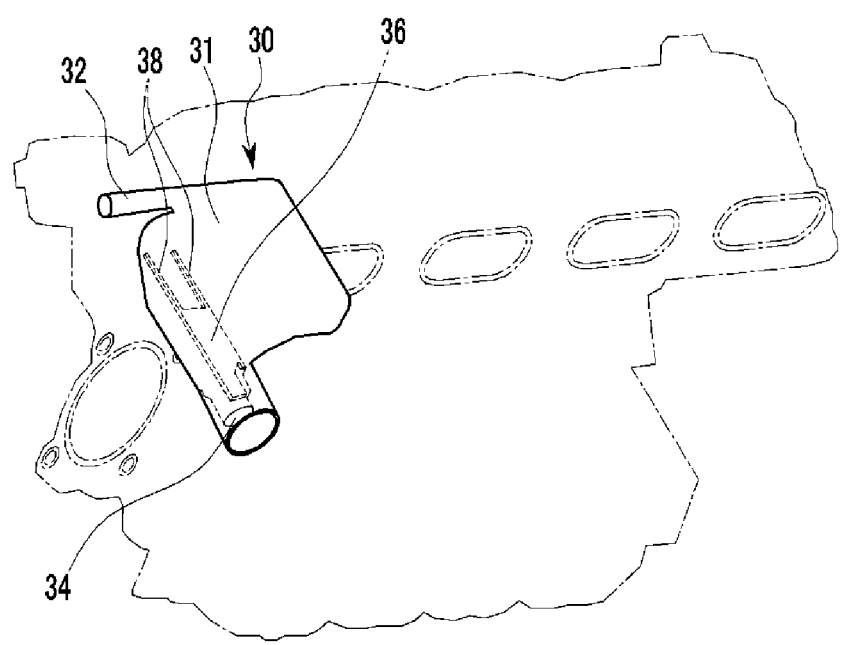
FIG. 2 is a perspective view of an exemplary apparatus for anti-freezing a PCV according to the present invention.

FIG. 1 illustrates an apparatus for anti-freezing a PCV according to the present invention mounted at an intake manifold portion, and FIG. 2 is a perspective view of an apparatus for anti-freezing a PCV according to the present invention.

As shown in FIG. 1, an apparatus 30 for anti-freezing a PCV according to the present invention is mounted at an intake manifold portion 20, and an engine 10 is positioned under the intake manifold portion 20.

The engine 10 includes a plurality of cylinders, and a piston is mounted in each cylinder. A combustion chamber is formed between an upper surface of the piston and an upper surface of the cylinder.

The intake manifold portion 20 supplies air-fuel mixture to the combustion chamber. For this purpose, the intake manifold portion 20 is connected to an intake passage so as to receive fresh air, and an injector is mounted so as to inject fuel to the intake manifold portion 20. In addition, the intake manifold portion 20 receives a blow-by gas passing through a PCV valve, and supplies the blow-by gas to a rear end of a throttle body so as to mix the blow-by gas with the air-fuel mixture.

The apparatus 30 for anti-freezing a PCV is mounted between the PCV valve and the rear end of the throttle body. The apparatus 30 for anti-freezing a PCV is slanted to a horizontal axis x. That is, an upper surface and a lower surface of the apparatus 30 for anti-freezing a PCV is slanted to the horizontal axis x by a predetermined angle. In the drawing, a left end along the horizontal axis x is called one end and a right end along the horizontal axis x is called the other end. In addition, an upper end along a vertical axis y is called an upper end and a lower end along the vertical axis y is called a lower end.

As shown in FIG. 1 and FIG. 2, the apparatus 30 for anti-freezing a PCV includes an inlet 32, a PCV chamber 31, and an outlet 34.

The inlet 32 is formed at one end portion on the horizontal axis x and the outlet 34 is formed at the other end portion on the horizontal axis x. In addition, the inlet 32 is formed at an upper end portion on the vertical axis y and the outlet 34 is formed at a lower end portion on the vertical axis y. Herein, forming the inlet 32 at the one end portion on the horizontal axis x means that the inlet 32 is formed at the one end portion when the apparatus 30 for anti-freezing a PCV is projected on the horizontal axis x. Similarly, forming the inlet 32 at the upper end portion of the vertical axis y means that the inlet 32 is formed at the upper end portion when the apparatus 30 for anti-freezing a PCV is projected on the vertical axis y.

The inlet 32 is connected to the PCV chamber 31 and supplies the blow-by gas passing through the PCV valve into the PCV chamber 31.

A space is formed in the PCV chamber 31. The blow-by gas flowing in the PCV chamber 31 expands in the PCV chamber 31. At this time, moisture in the blow-by gas is condensed and the condensed water is formed at an inner wall of the PCV chamber 31.

The outlet 34 is connected to the PCV chamber 31 and exhausts the blow-by gas in the PCV chamber 31 to the rear end of the throttle body. The blow-by gas exhausted through the outlet 34 is mixed with the air flowing through the throttle body. The outlet 34 has cylindrical shape and is slanged to the horizontal axis x by a predetermined angle θ.

In addition, the apparatus 30 for anti-freezing a PCV further includes protruding portions 38 and a partition 36.

Figure 3:
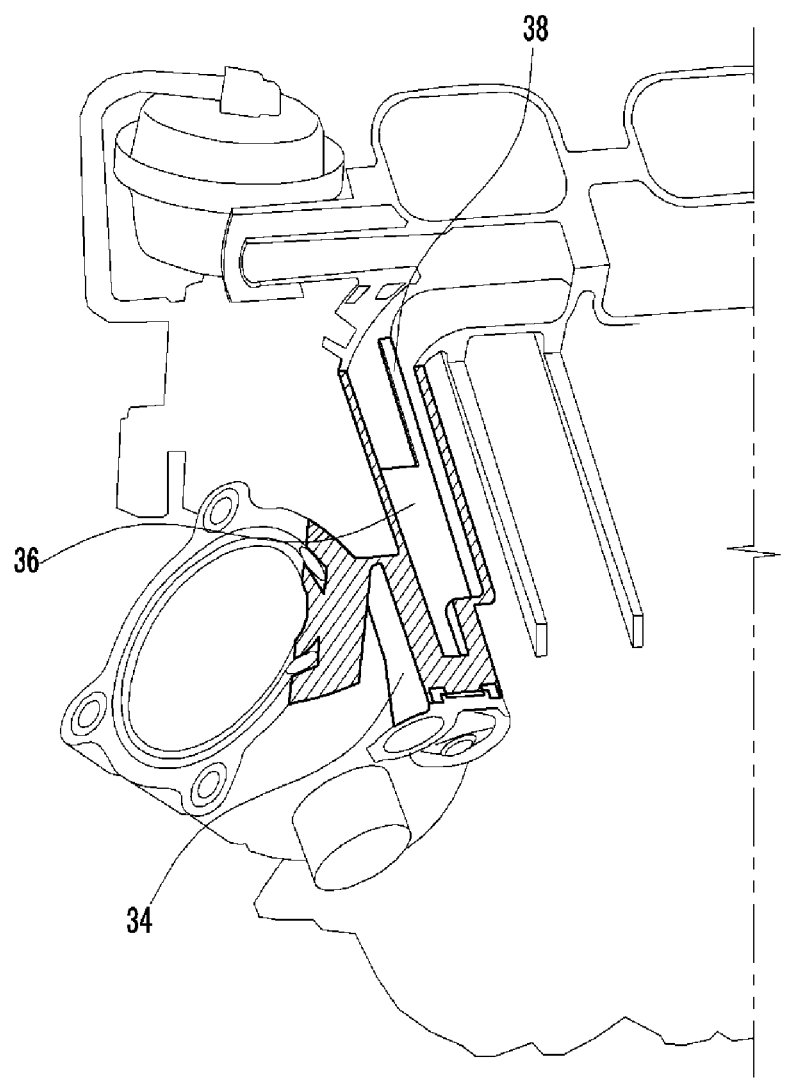
FIG. 3 is a partial cross-sectional view of an exemplary apparatus for anti-freezing a PCV according to the present invention.
Figure 4:
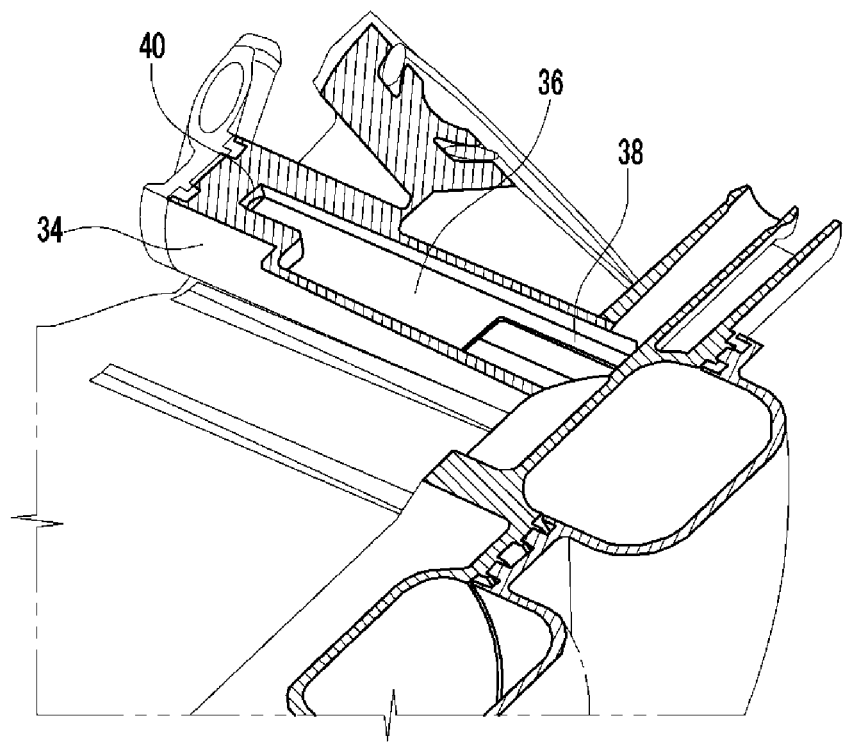
FIG. 4 is another partial cross-sectional view of an exemplary apparatus for anti-freezing a PCV according to the present invention.
Figure 5:
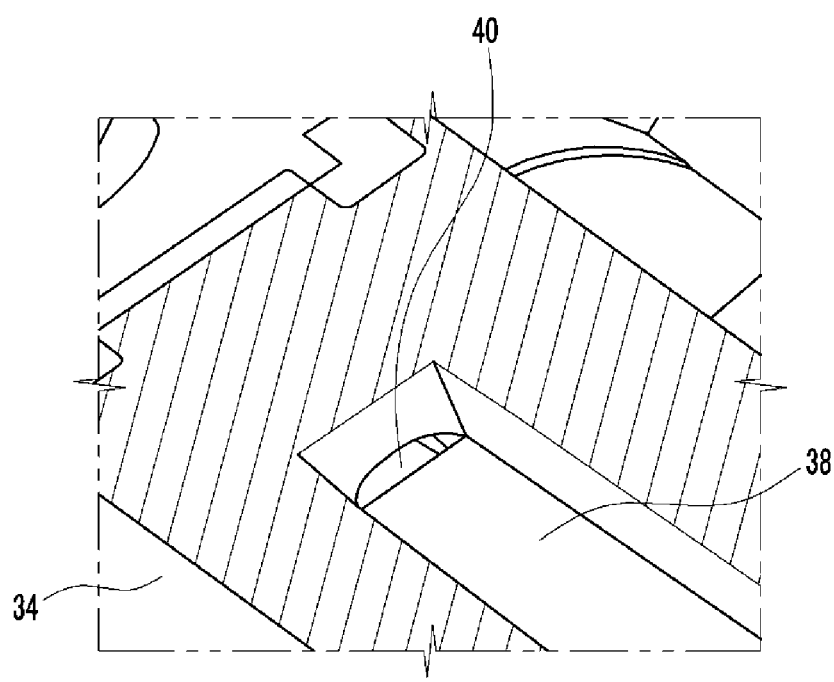
FIG. 5 is an enlarged view showing a drain hole in an exemplary apparatus for anti-freezing a PCV according to the present invention.

As shown in FIG. 3 and FIG. 4, the protruding portions 38 are formed at a front surface and a rear surface of the PCV chamber 31 along an extending direction of the outlet 34. The protruding portion 38 may extend from the one end portion to the other end on the horizontal axis x. That is, the protruding portion 38 may extend from the other end of the outlet 34 to an opposite wall of the outlet 34 along a length direction of the outlet 34. The protruding portion 38 leads the condensed water to the condensed water storage (referring to FIG. 7) when the condensed water formed at the inner wall of the PCV chamber 31 flows along the inner wall by gravity.

As shown in FIG. 3 and FIG. 4, the partition 36 has plate shape and mounted along a length direction of the protruding portions 38 at a part of the protruding portions. That is, the partition 36 extends from a middle portion to the other end portion on the horizontal axis x. If the partition 36 is formed at an entire length of the protruding portion 38, the blow-by gas in the PCV chamber 31 cannot flow into the outlet 34. Therefore, the partition 36 is mounted at a part of the length of the protruding portion 38 such that the blow-by gas in the PCV chamber 31 can flow into the outlet 34. In addition, the condensed water flowing to a part at which the partition 36 is not mounted is lead to the condensed water storage by the protruding portions 38.

Figure 7:
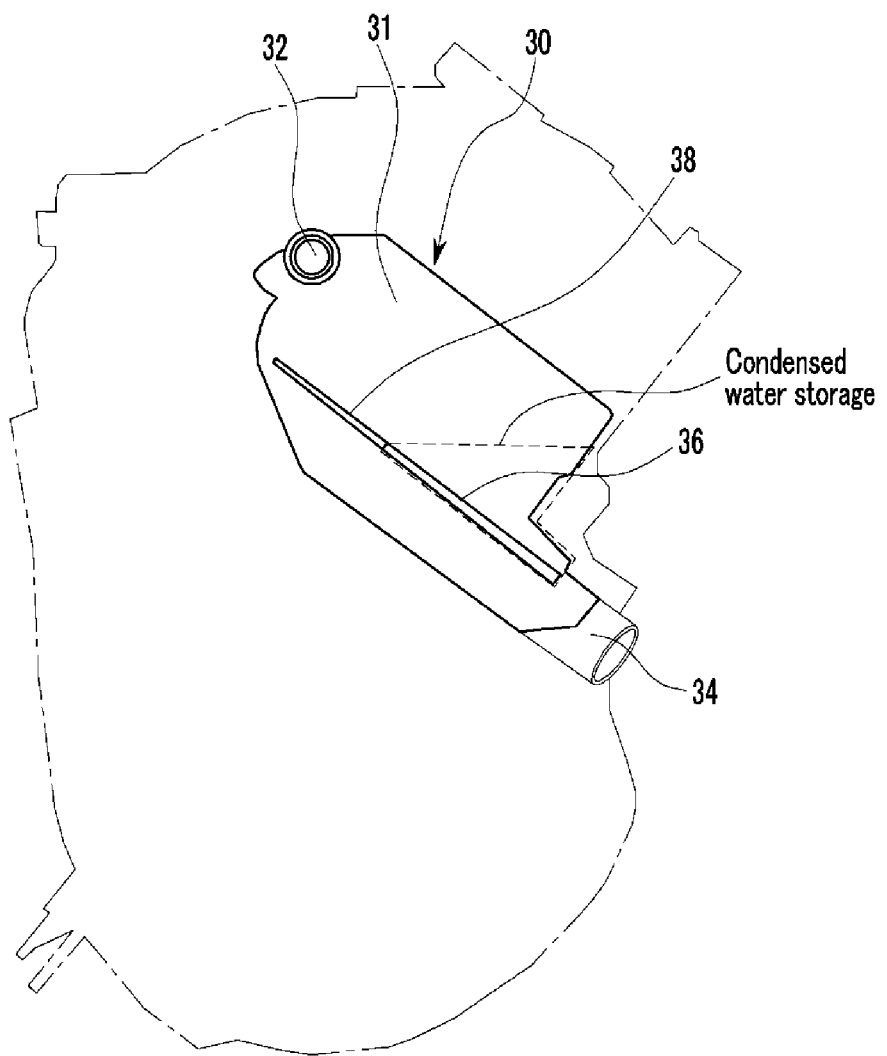
FIG. 7 illustrates operation of an exemplary apparatus for anti-freezing a PCV according to the present invention.

A drain hole 40 is formed between the other end of the partition 36 and the other end of the outlet 34. As shown in FIG. 7, since the apparatus 30 for anti-freezing a PCV is slanted to the horizontal axis x, the condensed water in the PCV chamber 31 flows to the condensed water storing portion positioned at the other end portion of the partition 36 by the protruding portion 38 and the partition 36. The condensed water gathered in the condensed water storing portion is flowed into the outlet 34 through the drain hole 40 little by little. The condensed water storing portion may not be physically defined.

Figure 6:
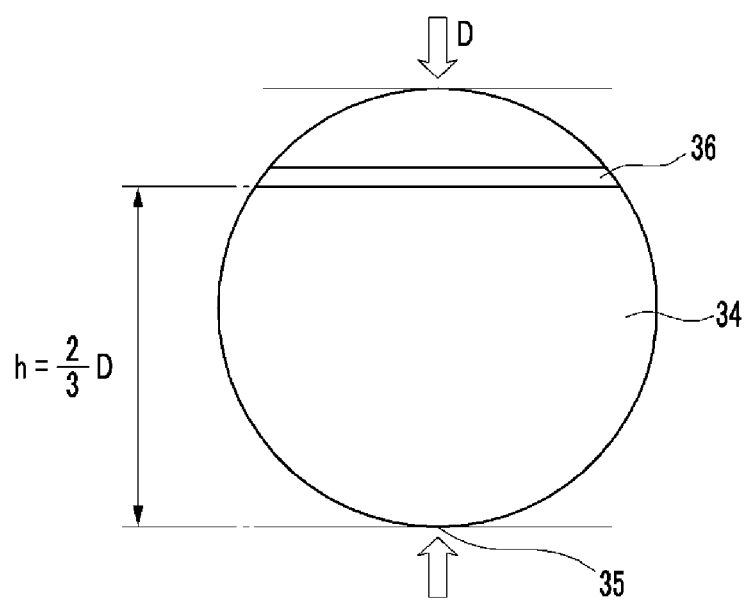
FIG. 6 illustrates a partition mounted at an outlet in an exemplary apparatus for anti-freezing a PCV according to the present invention.

The partition 36 is mounted along the outlet 34 and may be positioned lower than an upper surface of the outlet 34. As shown in FIG. 6, the partition 36 may be formed at a predetermined height from a lower end 35 of the outlet 34. The predetermined height may be approximately ⅔ of a diameter D of the outlet 34.

Referring to FIG. 7, an operation of the apparatus 30 for anti-freezing a PCV according to the present invention will be described.

As shown in FIG. 7, the blow-by gas flowing in the PCV chamber 31 expands and the moisture in the blow-by gas is condensed. As described above, the condensed water is formed at the inner wall of the PCV chamber 31, and flows to a lower portion of the PCV chamber 31 along the inner wall of the PCV chamber 31 by gravity.

The condensed water flowing to the lower portion of the PCV chamber 31 is blocked by the protruding portion 38 and the partition 36. The condensed water flows to the condensed water storage positioned at the other end of the PCV chamber 31 along the protruding portion 38 and the partition 36 and stays temporarily in the condensed water storage.

Since the drain hole 40 is formed between the other end of the partition 36 and the other end of the outlet 34, the condensed water in the condensed water storage is exhausted to the exterior of the PCV chamber 31 through the drain hole 40 and the outlet 34. In order to control amount of the condensed water exhausted through the drain hole 40, a diameter of the drain hole 40 may be sufficiently small.

Meanwhile, in a state that ambient temperature is very low and the engine is not warmed up, a portion of the condensed water in the condensed water storage may be frozen. Particularly, the condensed water in the condensed water storage is frozen so as to close the drain hole 40, and the condensed water in the PCV chamber 31 cannot be exhausted to the outlet 34. Therefore, the outlet 34 is prevented from being blocked completely by the frozen condensed water.

In addition, if the engine is warmed up in a state that the frozen condensed water closes the drain hole 40, the frozen condensed water is melted and the drain hole 40 is communicated with the outlet 34. Therefore, the condensed water in the condensed water storage is exhausted to the exterior through the outlet 34.

As described above, since condensed water in a PCV chamber is led to condensed water storage and flows out from the PCV chamber only through a drain hole, an outlet is prevented from being blocked completely according to the present invention.

Since the condensed water in the PCV chamber is frozen and blocks the drain hole of small diameter at a bitter cold region, the condensed water may not be flowed to the outlet. Therefore, the outlet is prevented from being blocked completely.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for anti-freezing a positive crankcase vent (PCV), comprising:
    a PCV chamber forming a space within an engine, whereby a blow-by gas may expand in the space;
    an inlet connected to the PCV chamber and adapted to supply the blow-by gas to the PCV chamber;
    an outlet formed lower than the inlet with respect to a horizontal axis, wherein the outlet is slanted with respect to the horizontal axis by a predetermined angle, and connected to the PCV chamber so as to exhaust the blow-by gas toward a rear of a throttle body of the engine;
    protruding portions formed at a front surface and a rear surface of an inner wall of the PCV chamber extending along a direction of the outlet, and guiding a condensed water at the inner wall of the PCV chamber; and
    a partition having a plate shape and mounted along a length direction of the protruding portions.

2. The apparatus of claim 1, wherein the inlet is formed at one end of the apparatus and the outlet is formed at the other end with respect to the horizontal axis, and
    wherein the inlet is formed at an upper portion and the outlet is formed at a lower portion with respect to a vertical axis.

3. The apparatus of claim 2, wherein the protruding portion is extended from the one end to the other end of the apparatus with respect to the horizontal axis.

4. The apparatus of claim 2, wherein the partition extends from a middle portion to the other end of the apparatus with respect to the horizontal axis.

5. The apparatus of claim 4, wherein a drain hole is formed between one end of the partition and the one end of the outlet.

6. The apparatus of claim 1, wherein the partition is formed along the outlet at a predetermined height from a lower end of the outlet.

7. The apparatus of claim 6, wherein the predetermined height is $\frac{2}{3}$ of a diameter of the outlet.

* * * * *